United States Patent
Shahverdi et al.

(10) Patent No.: US 10,131,341 B2
(45) Date of Patent: Nov. 20, 2018

(54) BANDWIDTH-BASED METHODOLOGY FOR CONTROLLING AND OPTIMALLY DESIGNING A HYBRID POWER SYSTEM

(71) Applicants: Masood Shahverdi, South Pasadena, CA (US); Michael S. Mazzola, Mint Hill, NC (US)

(72) Inventors: Masood Shahverdi, South Pasadena, CA (US); Michael S. Mazzola, Mint Hill, NC (US)

(73) Assignee: Mississippi State University, Mississippi State, MS (US)

(*) Notice: Subject to any disclaimer, the term of this patent is extended or adjusted under 35 U.S.C. 154(b) by 0 days.

(21) Appl. No.: 15/184,978

(22) Filed: Jun. 16, 2016

(65) Prior Publication Data
US 2016/0368482 A1    Dec. 22, 2016

Related U.S. Application Data

(60) Provisional application No. 62/180,497, filed on Jun. 16, 2015.

(51) Int. Cl.
| | |
|---|---|
| *B60L 9/00* | (2006.01) |
| *B60L 11/00* | (2006.01) |
| *G05D 3/00* | (2006.01) |
| *G05D 1/00* | (2006.01) |
| *G06F 7/00* | (2006.01) |
| *G06F 17/00* | (2006.01) |
| *B60W 10/08* | (2006.01) |
| *B60W 30/188* | (2012.01) |
| *B60L 11/18* | (2006.01) |

(Continued)

(52) U.S. Cl.
CPC ........... *B60W 10/08* (2013.01); *B60K 6/46* (2013.01); *B60L 11/18* (2013.01); *B60W 10/06* (2013.01); *B60W 10/26* (2013.01); *B60W 20/11* (2016.01); *B60W 20/13* (2016.01); *B60W 30/188* (2013.01); *B60L 2210/10* (2013.01); *B60L 2270/00* (2013.01); *B60W 2710/248* (2013.01); *Y02T 10/6217* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 9,056,556 B1 * | 6/2015 | Hyde | ........... B60L 11/1851 |
| 9,079,505 B1 * | 7/2015 | Hyde | ............. G06Q 10/0631 |

(Continued)

*Primary Examiner* — Anne M Antonucci
*Assistant Examiner* — Kenny A. Taveras
(74) *Attorney, Agent, or Firm* — Lawrence Arthur Schemmel

(57) ABSTRACT

The present invention provides a novel system and method for a power management strategy for series hybrid power systems, such as for vehicles, with limited electrical energy storage capacity that distributes instantaneous power between a source of chemical energy and a small energy storage system (ESS) efficiently. The invention provides for minimizing the energy storage system while simultaneously allowing the chemical to electrical energy converter, e.g., an internal combustion motor/engine paired with an electrical generator and/or a fuel cell power source, to operate in pre-defined efficient regions of the power user's, or vehicle's, fuel efficiency map.

18 Claims, 12 Drawing Sheets

(51) Int. Cl.
 *B60W 10/06* (2006.01)
 *B60K 6/46* (2007.10)
 *B60W 10/26* (2006.01)
 *B60W 20/13* (2016.01)
 *B60W 20/11* (2016.01)

(56) References Cited

U.S. PATENT DOCUMENTS

| | | | |
|---|---|---|---|
| 9,555,753 B2* | 1/2017 | James | B60R 16/03 |
| 9,597,940 B2* | 3/2017 | Anderson | |
| 9,705,357 B2* | 7/2017 | Apalenek | H02J 7/35 |
| 9,714,024 B2* | 7/2017 | Yoon | B60W 20/13 |
| 2003/0185575 A1* | 10/2003 | Ikeuchi | G02F 1/0123 |
| | | | 398/197 |
| 2006/0097575 A1* | 5/2006 | Xu | B60L 11/005 |
| | | | 307/9.1 |
| 2011/0221369 A1* | 9/2011 | Welchko | H02P 29/0241 |
| | | | 318/400.22 |
| 2012/0235622 A1* | 9/2012 | Welchko | B60L 3/0038 |
| | | | 318/722 |
| 2014/0288776 A1* | 9/2014 | Anderson | B60G 17/016 |
| | | | 701/37 |
| 2015/0239365 A1* | 8/2015 | Hyde | B60L 11/1861 |
| | | | 701/2 |
| 2016/0052410 A1* | 2/2016 | Zhou | B60L 11/1811 |
| | | | 320/109 |
| 2016/0052417 A1* | 2/2016 | Zhou | B60L 11/005 |
| | | | 701/22 |
| 2016/0052423 A1* | 2/2016 | Zhou | B60L 15/06 |
| | | | 701/22 |
| 2016/0052505 A1* | 2/2016 | Zhou | B60L 7/14 |
| | | | 701/22 |
| 2016/0141984 A1* | 5/2016 | Wolf | H02P 6/10 |
| | | | 318/400.23 |
| 2016/0311325 A1* | 10/2016 | Lieu | B60L 11/16 |
| 2016/0368482 A1* | 12/2016 | Shahverdi | B60W 30/188 |
| 2017/0096134 A1* | 4/2017 | Yoon | B60K 6/547 |
| 2017/0163201 A1* | 6/2017 | Nakamoto | H02P 29/024 |
| 2017/0225534 A1* | 8/2017 | Anderson | B60G 17/016 |

\* cited by examiner

BANDWIDTH-BASED METHODOLOGY FOR CONTROLLING AND OPTIMALLY DESIGNING A HYBRID POWER SYSTEM

CROSS-REFERENCE TO RELATED APPLICATION

This application claims priority from U.S. Provisional Patent Application Ser. No. 62/180,497 filed Jun. 16, 2015. The entirety of the provisional application is incorporated herein by reference.

FIELD OF THE INVENTION

The present invention relates to the field of hybrid power systems and more specifically to a novel system and method for controlling and designing hybrid power systems that can be applied to vehicular systems.

BACKGROUND OF THE INVENTION

The system and method of the present invention provides a novel bandwidth-based methodology to control and to optimally design a hybrid power system applicable in multiple fields, for example in power train integration and intelligent power train scheduling. One deficiency in the prior art is the lack of control systems that can be implemented on feasible real-time controllers that integrate chemical energy conversion devices with energy storage systems with the small size, fuel efficiency, and driving performance that the present invention provides. Current prior art systems typically result in excess capacity for the energy storage system that increases the cost and weight of the final system. At least one prior art system description can be found at: Tani, Abdallah, Mamadou Bailo Camara, and Brayima Dakyo. "Energy management based on frequency approach for hybrid electric vehicle applications: Fuel-cell/ lithium-battery and ultracapacitors." Vehicular Technology, IEEE Transactions on 61, no. 8 (2012): 3375-3386.

A need exists to provide a new system and method for providing power management for hybrid power systems, for vehicular systems for example, that efficiently distributes instantaneous power between a source of chemical energy and an energy storage system. The present invention provides such a system and method.

SUMMARY OF THE INVENTION

The present invention provides a new system and method for a real-time power management strategy for series hybrid power systems, specifically a hybrid energy and power delivery system, with limited electrical energy storage capacity that distributes the instantaneous power between a source of chemical energy and a small energy storage system efficiently. The invention allows the energy storage system to be minimized while allowing the converter of chemical energy to electrical energy, e.g., an internal combustion engine paired with an electrical generator and/or a fuel cell power source, for example, to operate in pre-defined efficient regions of the prime-mover's or vehicle's fuel efficiency map.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages. The drawings, which are incorporated in and form a portion of the specification, illustrate certain preferred embodiments of the invention and, together with the entire specification, are meant to explain preferred embodiments of the present invention to those skilled in the art.

DETAILED DESCRIPTION OF THE INVENTION

Figure 1:
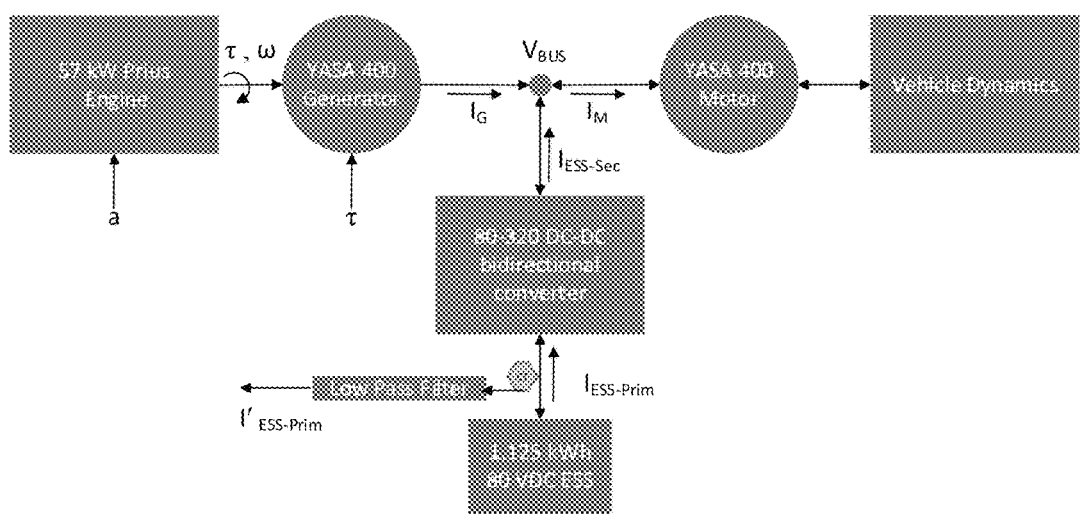
FIG. 1 depicts a pictorial representation of a block diagram of the powertrain and the variables involved in the bandwidth-limited engine power controller of the present invention.

The present invention involves a novel power management strategy has been developed for series hybrid power systems, including any hybrid energy and power delivery system, with limited electrical energy storage capacity that distributes the instantaneous power between a source of chemical energy and an energy storage system (ESS), preferably a small ESS, efficiently. The term 'hybrid power system' is used interchangeably herein as a 'hybrid energy and power delivery system'. The invention provides a real-time strategy that is designed to allow the energy storage system to be minimized, while allowing the converter of chemical energy to electrical energy (e.g., an internal combustion engine paired with an electrical generator and/or a fuel cell power source, for example) (defined herein and referred to as "generator") to operate in pre-defined efficient regions of the prime-mover's, or a vehicle's, fuel efficiency map. The methodology of the invention is applicable to any hybrid energy and power delivery system with the prime power source, battery, and load configuration shown in the defining figures. The invention therefore involves a series architecture but is not limited to an automobile. Stationary fuel cell powered systems are a notable and directly applicable example. The application of the invention to vehicles includes trains; airplanes; air vehicles; automobiles; land, water, and space transportation vehicles; trucks; and ships, for example. The cost and fuel economy of hybrid electrical vehicles (HEVs) are significantly dependent upon the power-train ESS. A series HEV with a minimal all-electric mode (AEM) permits minimizing the size and cost of the ESS. The present invention discloses a system and method for finding an optimal design of the series hybrid power train that reduces the required size and/or weight of the ESS by trading the overall fuel efficiency of the prime mover optimally. The optimal design is found using a bandwidth-based methodology for designing the power train controller. One embodiment of the invention is disclosed by the optimal design of a sports car class Series-HEV (SHEV) based on an advanced bandwidth-based controller. The result allows an SHEV to be realized with about 1.13 kWh ESS capacity.

The system and method of the invention is broadly applicable to any SHEV by adjusting the internal constants of the at least one bandwidth-based proportional controller of the invention as a partial set of degrees of freedom in an optimal design process. The other degrees of freedom include, for example, battery size in terms of capacity as measured by the number of cells, with a DC/DC power converter permitting the vehicle power bus voltage to be matched to the nominal battery pack voltage. Maximizing fuel economy (FE) while minimizing ESS cost is more aligned with customer acceptance in the current and likely future state of the consumer market. The techniques applied to manage the power flow between the various energy sources of the power-train significantly affect the results of this optimization. A Pareto Frontier, including ESS cost and FE, for an SHEV with limited AEM, is computed using the system and method disclosed for an advanced bandwidth-based control strategy teamed with duty ratio control. This controller allows the series hybrid's advantage of tightly managing engine efficiency to be extended to smaller ESS, as compared to the prior art represented by the size of the ESS in comparable products on the market.

The present invention has application in multiple fields, such as power train integration and intelligent power train scheduling. Examples of commercial value in power train integration are as follows:

(1) Enabling cost and performance acceptable integration of internal combustion engine/generator sets with small capacity energy storage systems (based primarily on batteries but also including ultra capacitors and conventional capacitors) to produce more fuel efficient designs. The markets for this type of power system integration include series-hybrid electric vehicles and microgrids for on-grid and off-grid electrical systems.

(2) Enabling cost and performance acceptable integration of fuel cells with small capacity energy storage systems (based primarily on batteries but also including ultra capacitors and conventional capacitors) to produce more fuel efficient designs. The markets for this type of power system integration include series-hybrid electric vehicles and microgrids for on-grid and off-grid electrical systems.

(3) Enabling cost and performance acceptable integration of gas turbine/generator sets with small capacity energy storage systems (based primarily on batteries but also including ultra capacitors and conventional capacitors) to produce more fuel efficient designs. The markets for this type of power system integration include series-hybrid electric vehicles and microgrids for on-grid and off-grid electrical systems.

The deficiency in the prior art is the lack of control systems that can be implemented on feasible real-time controllers that integrate chemical energy conversion devices with energy storage systems (as enumerated in examples (1) through (3) above) with the small size, fuel efficiency, and driving performance enabled by the present invention. The prior art often results in excess capacity for the energy storage system that increases the cost and weight of the final systems. The present invention can reduce at least one or more obstacles to consumer acceptance of the resulting products, or in other cases may lead to new products that may not have otherwise been developed due to doubt about commercial feasibility.

The invention has commercial value in power trains with a large surplus of ESS capacity, such as plug-in hybrid electric vehicles and range-extended electric vehicles through intelligent power train scheduling. The bandwidth-based methodology of the present invention can be used as part of a vehicle supervisory control system to reserve electrical energy stored from charging the battery from the grid before the vehicle is driven until it is optimally expended during the time the vehicle is driven. This is termed real-time drive-cycle optimization, which requires an adaptive controller capable of recognizing patterns in the driving behavior despite the randomness of actual driving and to expend the available energy stored in the battery in such a way as to maximize the fuel economy and/or range of the vehicle considering the details of each driving experience as they occur. The present invention and its embodiments include various statistical methods to make good control decisions automatically without driver interaction despite the random aspects of real-world driving, which can in turn be leveraged by a supervisory vehicle controller to optimize and manage the consumption of energy (both stored and generated) during any power delivery cycle, and in this case the vehicle drive cycle.

The present invention is applicable to vehicles including, for example, a series hybrid electric vehicle (SHEV). The twin goals of maximizing Fuel Economy (FE) and improving consumer acceptance has led to a SHEV powertrain using energy storage as a means for filtering drive cycle power demands on the engine, rather than an energy source for supplying an all-electric mode. The invention and concept is intended to minimize, if not eliminate, the battery in the SHEV without resorting to full range proportional control of the motor/engine and generator/fuel cell power source. An initial optimization study reported for a mid-size SHEV showed a 4.5 kWh Li-ion battery pack was still required.

A study involving a sports car class SHEV resulted in the system and method of the present invention. The challenge with this vehicle was to reduce the ESS size even more because the available space allocation is only one fourth of the battery size in the mid-size. As a result, a method of designing a hybrid power system and a controller were developed that allows a hybridized SHEV to be realized with a light ESS. The controller of the invention includes a duty cycling feature that manages the engine performance in multiple efficient regions and a bandwidth limited-proportional controller feature that limits low bandwidth battery current.

The performance of the controller has been validated for a SHEV power-train model with a 80 VDC 1.125 kWh battery, plus an 80 VDC 46.4 Farad Ultra capacitor module using a customized Autonomie vehicle model. The preliminary results showed that the combined FE of the new design was increased by about 13 percent comparing to the corresponding FE in the equivalent conventional vehicle.

Introduction

Electrified vehicles, which are able to reduce the dependency on petroleum, are an accepted surrogate for conventional vehicles. In general, an electrified vehicle offers lower fuel consumption but higher cost of ownership. A series hybrid electric vehicle (SHEV) is one of the electrified vehicle configurations with two well-established designs in the market. The first design, with a decade background, is SHEV with no energy storage system, which is not usually considered as a hybrid vehicle, and uses an electrical power train for energy transmission. Two examples of this design are diesel-electric locomotives and large earth-moving vehicles. The second design, which is the more recent, is a hybrid passenger vehicle with a large energy storage system. One example is the Chevrolet Volt which has a relatively large ESS (16.5 kWh). Although vehicles like the Volt, compared to conventional counterparts, have high fuel economy, they are costlier.

Only about four percent of the U.S. vehicle market is owned by any type of electrified vehicle with 90% of the contribution from HEV. An intermediate HEV with relatively light ESS as an alternative to the second design HEV (relatively large ESS) may be of interest. A parametric study on size of the ESS for a SHEV was carried out (Shahverdi, M., Mazzola, M., Doude, M., Grice, Q. 2014), which resulted in a 4.5 kWh ESS. A customized duty ratio control was developed to handle the HEV light power train energy management.

The inventors designed a very light ESS for a series hybrid BRZ concept car as a motivation for the more general research reported herein. The sports car utilized had a physically limited space allocation for the ESS, which caused a severe challenge to applying the previously developed duty ratio control strategy. A new control strategy was required because duty ratio control imposes limitations on managing the much smaller ESS. The sport car application necessitated the formulation of, and solution to, the general design problem which has been discussed using a reference vehicle model. Literature classifies power management of electrified vehicles based on the type of applied method. The power management problem was reviewed for series, parallel, series parallel, and power split REV (Chau, K. T., and Wong, Y. S. 2002) and PHEV (Wirasingha, S. G., and Emadi, A. 2011), (Bradley, T. H., and Frank, A. 2009), (Mapel F Mauri, M., and Tarsitano, D. 2009). Control strategies were classified to rule-based methods and optimization-based methods. Rule-based methods were usually implemented based on a state machine operating with variables such as SOC and engine on/off. In this case, controller parameters were set in advance (Yoo, H S. K., Park, Y., and Jeong, J. 2008), (Camara, M. B., Gualous, H., Gustin, F. 2010), (Yan, W. Utkin, V., and Rizzoni, G. 2005) and may be adjusted in real-time with a fuzzy logic algorithm (He, X., Parten, M., and Maxwell, T. 2005), (Li, S. G., Sharkh, S. M., Walsh, F. C. and Zhang, C. N. 2011). In contrast with rule-based methods, which were optimized at the component level, optimization-based methods optimized the controller for achieving optimal overall vehicle performance. They may use regular dynamic programming (Lin, C. C Peng, H., Grizzle, J. W., and Kang, J. M. 2003), stochastic dynamic programming or equivalent consumption minimization (Liu, J., and Peng, H. 2008), genetic-fuzzy (Poursamad, Amir, and Morteza Montazeri. 2008), particle swarm (Wu, Xiaolan, Binggang Cao, Jianping Wen, and Yansheng Bian 2008), and (Wu, J., C-H. Zhang, and N-X. Cui 2008), or Pontryagin's minimum principle (Kim, Namwook, Sukwon Cha, and Huei Peng 2011), or a neural network (Moreno, Jorge, Micah E. Ortiizar, and L. W. Dixon 2006) algorithm for developing optimal control.

In the references cited above, power flow distribution between sources of energy in powertrain was based on either sharing the period of operations or sharing the requested power instantaneously, for example by a hybridizing factor (Wang, Lei, Emmanuel G. Collins Jr, and Hui Li 2011), in the time domain. However, it is also possible that load was shared between energy sources based on the frequency characteristics of each energy source. In (Tani, Abdallah. Mamadou Ballo Camara, and Brayima Dakyo 2012), two different configurations are considered: Fuel cell+Capacitor and Battery+Capacitor. Load sharing between energy sources was carried out in the frequency domain with a polynomial correction method. The frequency of the low pass filter which has been used for the capacitor branch was set on a fixed time constant. Inspired from the literature on power management, an innovative hybrid control strategy using two features of efficient engine management, duty cycling and bandwidth-based proportional control, was developed that passes the feasibility study for a reference vehicle model with extremely light ESS.

Reference Vehicle Specifications

FIG. 1 shows the architecture and specifications of the powertrain of the reference vehicle which was used and depicts a block diagram of the powertrain (power bus) and the associated variables involved in the bandwidth-limited engine power controller and that affect the control of the system. A downsized motor/engine compared to the original engine in the conventional vehicle was used for this design because it has been shown (Shahverdi, M., Mazzola, M., Doude, M., Grice, Q. 2014) that a smaller engine, for example a 57 kW version, leads to higher fuel economy. In FIG. 1, powertrain variables which are impacted by the controller are defined as follows:

$V_{BUS}$: Bus voltage, an instantaneous voltage shared between motor, generator, and battery at a common node. In the following analysis, the voltage is considered as a constant variable compared to the large variation in currents.

$I_M$: Motor current is instantaneously variable in proportion to drive cycle power requested at the wheels if bus voltage is considered constant.

$I_{ESS\text{-}prim}$: ESS current is an instantaneous variable which matches the difference between generator output power and motor power request.

$I_{ESS\text{-}prim}'$: Bandwidth-limited (BWL) ESS current is a filtered ESS current which is measured by a sensor facilitated with a low pass filter.

$I_B$: Battery current is an instantaneous variable which contributes to the matching of the difference between generator output power and motor power request.

$I_B'$: BWL battery current is a filtered battery current which is measured by a sensor facilitated with a low pass filter.

$I_G$: Generator current by definition is a BWL current because it is controlled using the bandwidth limited battery current in the proportional control process ($I_G = I_G'$).

$\tau$: Generator torque is a BWL torque which can be adjusted at the generator side of the engine. The generator controller adjusts the torque as a load on the engine driveshaft using a reference input "$\tau$".

$\omega$: Engine shaft speed which is controlled via an accelerator reference input "a" in engine ECU.

A close loop feedback speed control was also used ($\omega = \omega_{Ref}$).

The reference vehicle model was developed in Simulink. Vehicle dynamic and motor models were both borrowed from series HEV library of Autonomie software (Argonne National Labratory, and LMS 2013) and updated with the YASA 400 efficiency map. However, independent behavioral models of the generator and the engine were used respectively. The YASA-400 efficiency map, and the 57 kW Prius engine efficiency map are created and integrated to the rest of the powertrain in a way that key variables, like generator torque and engine speed, can be controlled. The ESS was modeled with SimPowerSystems of Simulink library (Li, Jianwei, Michael S. Mazzola, James Gafford, Bin Jia, and Ming Xin 2012). A simplified bidirectional DC-DC converter was also modeled in order that 80 VDC ESS interfaced to the 320 VDC bus.

Thermostat Control Limitations

Figure 2:
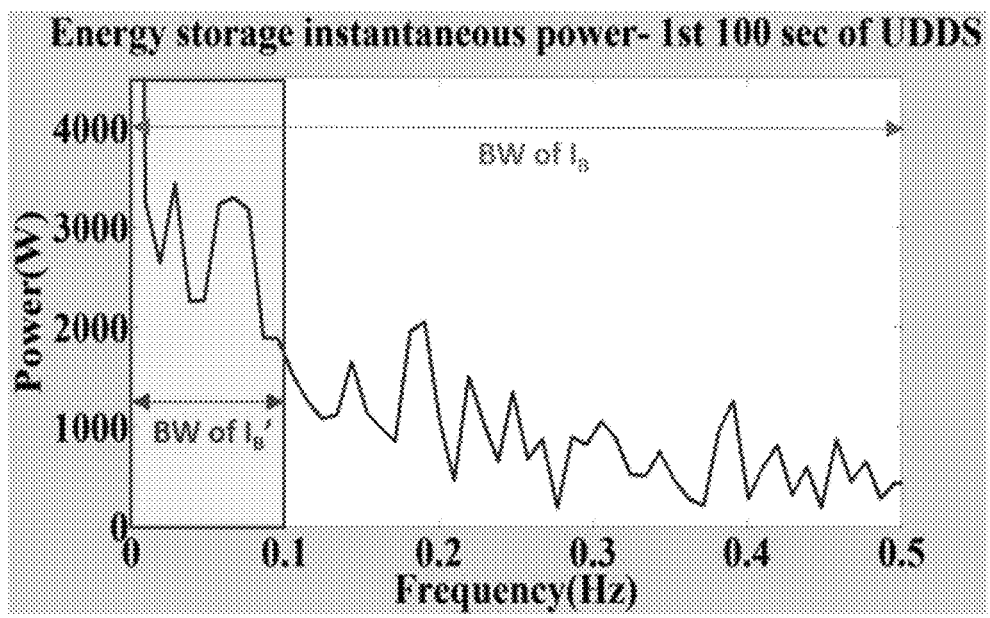
FIG. 2 depicts a graphical illustration of the results of a case study for a reference vehicle in city driving conditions, where the power spectrum is shown in the frequency domain.

The challenge is to design a viable hybrid series power train with extremely light ESS. If a duty ratio control strategy is used to manage the engine at the efficient operating points, in engine off mode the ESS is responsible for providing for the load independently. Typical load request at the ESS can be fairly estimated by exciting the power train of the reference model in FIG. 1 with a published standard drive cycle such as city drive cycle (UDDS) or highway drive schedule (HWFET). A case study has been carried out for a reference vehicle in city driving condition. FIG. 2 shows the result of this study in the frequency domain and depicts a city driving condition power spectrum. The time domain ESS power signal has been transformed to a frequency domain spectrum using a Fast Fourier transform of MATLAB. FIG. 2 shows the power spectrum of the battery experimentally measured on the MSU EcoCar vehicle during the first 100 s of the UDDS (urban) drive cycle. Two hypothetical bandwidths for the battery current are superimposed. The battery current as measured over the entire bandwidth at the 1 Hz sampling rate is $I_B$. The battery current that would be measured by a system limited to a bandwidth BW is $I_B'$. The battery capacity avoided by using a proportional controller for the engine-generator that zeroed $I_B'$ over the hypothetically limited spectral power range shown would be significant. The trend shows that the DC value of the power spectrum, and the very low frequency power spectra are substantially larger than components with higher frequency. In other words, the ESS undergoes large DC/low bandwidth power requests. When 80 VDC ESS is used, the current magnitude is $$R = 4 = \frac{320}{80}$$

times greater than the 320 VDC battery current. These large currents are beyond the nominal discharge rating of the battery. Therefore, having a more sophisticated controller that is able to control this problem and also manage the engine performance to maintain operation in efficient regions of the brake-specific fuel consumption map is necessary.

Innovative Bandwidth-Based Control Strategy

A new control strategy is required in order to distribute the power between engine and "reduced size ESS" in a way that the requested load at the electrical motor is fulfilled, maximum and minimum power constraints of the energy sources are met, and overall powertrain efficiency is maximized. The present invention accomplishes this strategy. For a SHEV with light ESS, where the ESS is defined as both light in weight and reduced in size, it is necessary to mitigate the low bandwidth power variations as mentioned in the previous section. The engine is the only source of energy which is able to handle the power in the long-duration bandwidth. By extending the bandwidth delivered by the engine, the ESS power in the low bandwidth part will be reduced. In the plot in FIG. 2, the horizontal arrow at the top (4000 W) specifies the bandwidth of the ESS in the original control strategy. The rectangular area at the left displays the hypothetical frequency band which should be removed in new control strategy from ESS responsibility and added to the engine/generator responsibility.

It is hypothesized that developing a controller with two features of engine duty cycling and proportional control allows an efficient powertrain with extremely light ESS to be realized. If instead of two constant engine operating modes, multiple constant operating modes—proportional to various driving behaviors—are created, the low-frequency power request from the ESS is diminished. The new operating points are selected with low fuel consumption rates which is assumed to lead to a higher fuel economy compared to the situation where the engine operating points vary proportionally to the drive cycle load. However, to have the engine functioning with duty cycling scheme in a HEV with extremely light ESS the proportional controller is required to filter the low bandwidth portion of the drive cycle in a way that the ESS operates in its rated zone.

The objective is to find the optimum bandwidth below which engine operation is actively controlled to provide for the load and above which the ESS passively supplies the drive cycle power request. The frequency range which is the subject of this search is within the bandwidth of engine and battery operation. Bandwidth of other sources of energy for instance, ultra-capacitor if it is available, is outside the domain of this search. Therefore, the result of this study will not be affected by adding high bandwidth energy storage devices.

Limited-Bandwidth Proportional Control Algorithm

The proportional control algorithm is first described because the conditions causing state changes are affected by proportional controller performance in each state. In the following analysis, the error equation for proportional control is derived. $V_{BUS}$ is considered a constant parameter. Total harmonic distortion (THD) of the bus voltage is very small on the power bus of a HEV while that of the motor current signal is significant (Shahverdi, Masood, Michael Mazzola, Nicolas Sockeel, and Jim Gafford 2014). Therefore, the current variable can be used as a replacement for power in the small signal analysis. For a common node on FIG. 1 between motor, generator, and ESS, Kirchhoff's law is written:

$$I_{ESS-Sec} = I_M - I_G \qquad (1)$$

Eq. 1 can be re-written in Eq. 2 form as:

$$I'_{ESS-Sec} = \frac{I'_B}{R} = I'_M - I_G \Rightarrow I'_B = R \times (I'_M - I_G) \qquad (2)$$

where $I'_B$ and $I'_M$ are BWL version of true currents and R=4 is the converter ratio. Again, it is noted that $I'_G=I_G$, because the generator current is the output of a bandwidth limited control process. Eq. 2 is the error equation required for proportional control. The controller only receives $I'_B$ as an input which is measured by a BWL sensor.

Figure 3:
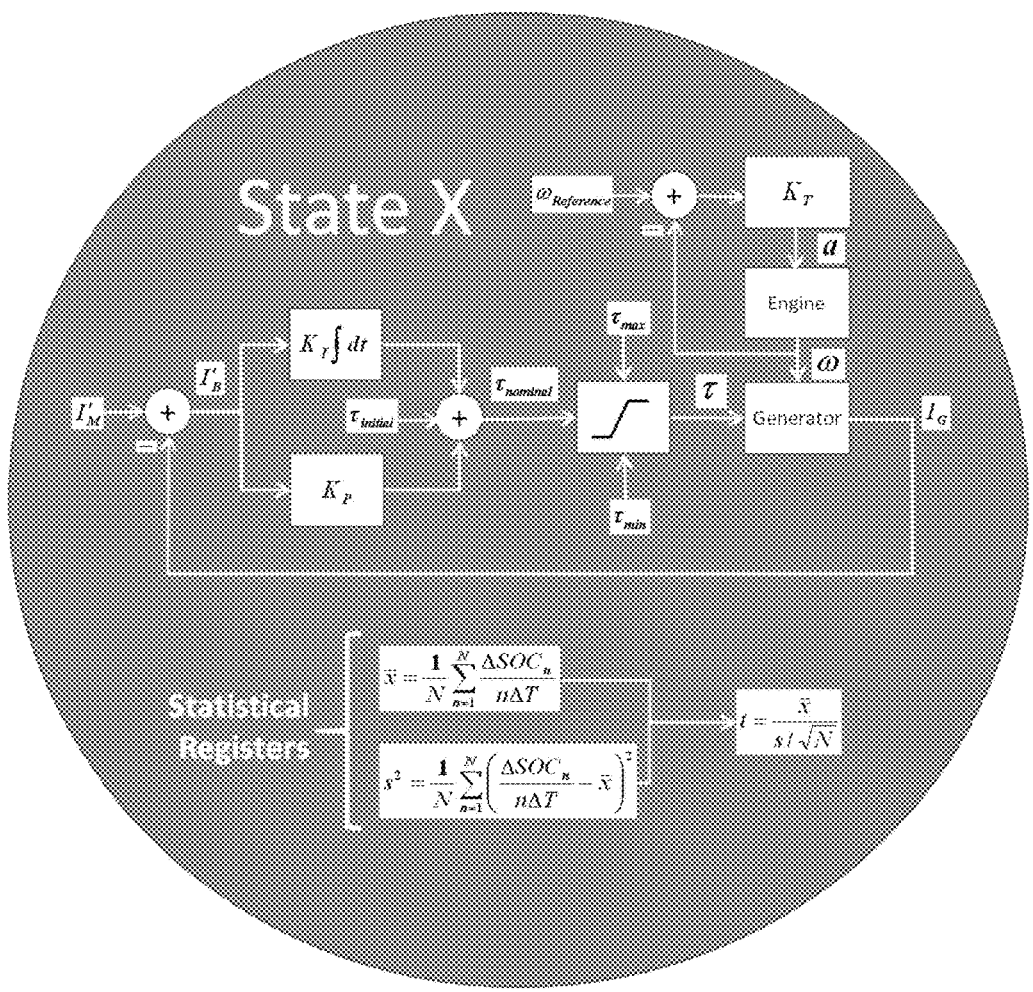
FIG. 3 depicts a block diagram of the limited bandwidth-based proportional-integral controller of the present invention in arbitrary state X.
Figure 4:
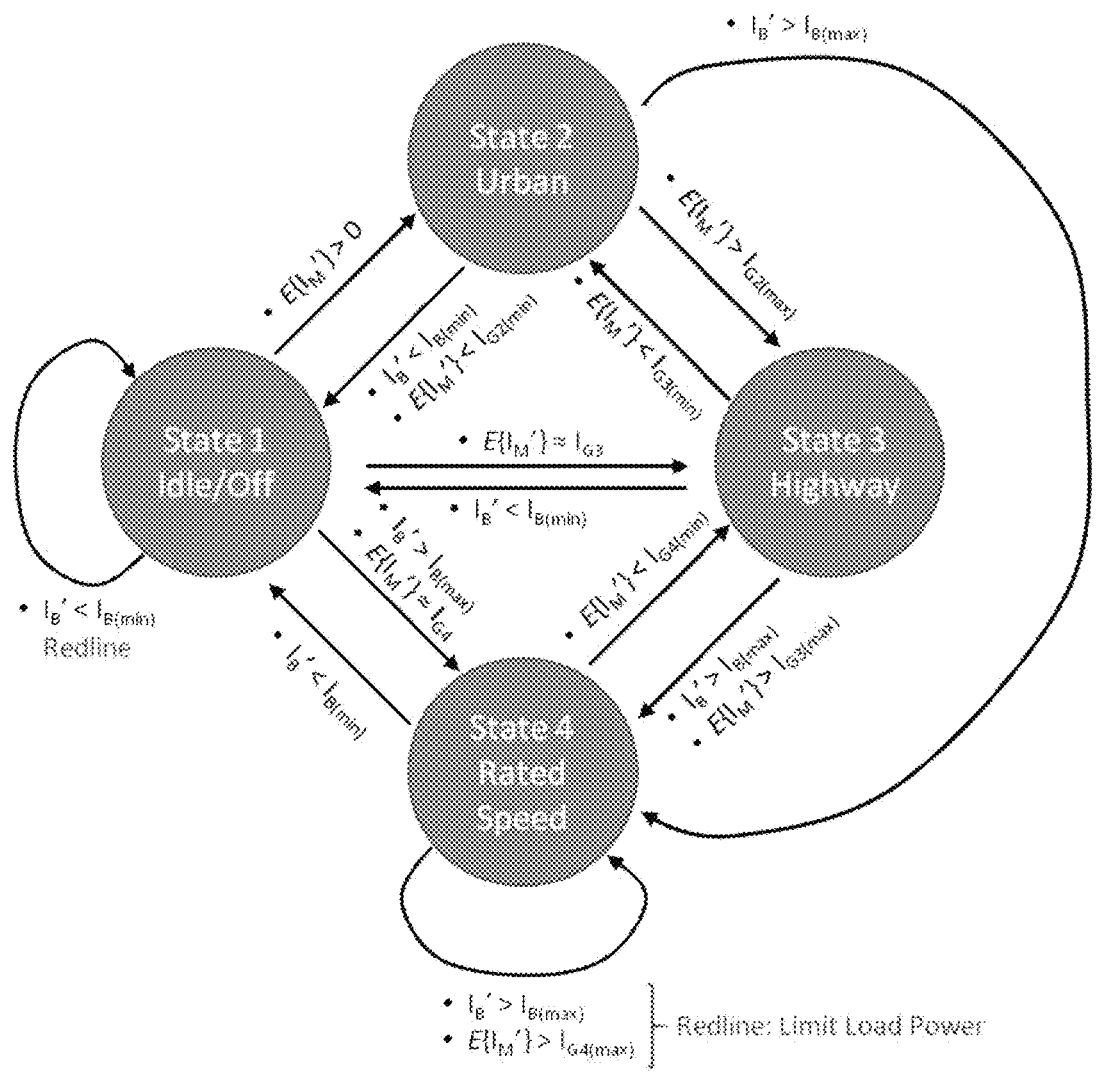
FIG. 4 depicts a proposed state machine of the present invention that makes decisions for changing the states when the mismatch between the expected motor current and expected generator current is statistically significant.

FIG. 3 illustrates the block diagram of the BWL proportional-integral (PI) controller in arbitrary state X. Controller states are defined by the nomenclature in the section entitled "Reference vehicle specifications." In state X, a specific hysteresis band defines nominal, upper and lower torque threshold. In this study, standard published drive cycles are used as examples for defining nominal and thresholds of intermediate states. FIG. 3 shows power generating states consist of an engine speed controller, a generator current controller, and registers to accumulate statistics used to test for state changes. The generator current controller is shown as a PI type, but other compensating types could be used alternatively. Each state is initialized by resetting the integrator and the statistical registers, and setting the parameters $\omega_{reference}$, $\tau_{initial}$, $\tau_{max}$, and $\tau_{min}$. In FIG. 4, star mark, tip of up arrow, and tip of down arrows respectively determine the nominal, maximum, and minimum torque for urban, and highway condition at constant speed.

For example, if urban state is selected in duty cycling process, in proportional controller torque is limited to [10-40] Nm range at 235 rad/s constant shaft speed. PI controller zeroes the BWL portion of battery current, $I'_B$, as long as the requested power is within the proportional range of the current state.

FIG. 4 shows the state flow diagram for the power train controller. Four states are defined based on broadly-defined driving behaviors, although other alternative embodiments may and can include more or less than four states. For FIG. 4, the following definitions apply:

$E\{I'_M\}$=Expected value of the bandwidth-limited (BWL) motor (load) current. Equal to the BWL motor (load) current averaged over time if the drive cycle is ergodic.

$I'_B$=Battery current measured by the BWL sensor.

$I_{B(min)}$=Minimum rated current of the battery. This value is less than zero.

$I_{B(max)}$=Maximum rated current of the battery. This value is greater than zero.

$I_{Gx(max)}$=Upper limit of proportional control of the generator current while in state x.

$I_{Gx(min)}$=Lower limit of proportional control of the generator current while in state x.

$E\{I'_M\} \approx I_{Gr}$=Return to state x after transition to State 1 caused by an $I'_B < I_{B(min)}$ detection.

Redline=A limit placed on motor (load) current.

While in State 1 redline is caused by detecting a BWL battery current less than the minimum battery rating ($I'_B < I_{B(min)}$).

While in state 4 redline is caused by detecting either a BWL battery current in excess of maximum battery rating ($I'_B > I_{B(max)}$) or an expected motor current in excess of the upper proportional limit ($E\{I'_M\} > I_{G4(max)}$).

FIG. 4 represents a state machine. The invention comprises at least one state machine controller. The controller uses statistical tests to recognize the general behavior of the driving cycle (e.g., idle/off, urban, highway, rated speed), and makes state changes as necessary. Each state of the state machine has a proportional controller with its own parameters. The inventors chose four (4) states, for example, but there exist a plurality of states, more or less than four, depending on the particular vehicle. As a result, the number of states of the state machine can be more or less than the four described herein. When state changes are necessary, it is because the BWL load power is outside the capability of the proportional controller to match it with generated power; the latter being constrained by the unique range of the proportional control in each state. If the average load power is outside the limits of any discrete state then duty ratio modulation of engine power will balance the power. When the average load power is within the limits of a discrete controller, then the generator output is "captured" by the state such that duty ratio modulation of the engine power should not occur and the BWL battery current is zeroed out by the action of the proportional controller. The conditions that cause state changes are linked to the operation of the proportional controller within each state. Thus analysis of the proportional controller is required before algorithms governing state changes can be designed.

State Machine Controller Algorithm for Duty Cycling

As long as the controller operates within the proportional range of the current state, there is no need to change the state. However, when the power requested by the motor is outside the range, the controller is not able to match the generation to the bandwidth limited demand. In this case, a state machine is required to decide when transition to higher or lower states should occur. FIG. 4 shows the proposed state machine control algorithm. The state machine makes decisions for changing the states when the mismatch between expected motor current and expected generator current is statistically significant. Four states are shown to represent four different driving behaviors, although additional states are possible in alternative embodiments. In state X, parameters of BWL PI controller and engine such as nominal, upper and lower torque threshold, and shaft speed are defined. Four states are therefore defined. Parameters in state 2 and state 3 are respectively defined based on standard urban and highway drive cycles. State 4 is proportional to engine continuous rated power which is usually determined by the vehicle top speed requirement, so torque hysteresis band and driveshaft speed of this state is selected proportional to the top speed requirement. Additional states of the state machine are possible, and even likely, depending on the type of vehicle. Arrows between states specify the conditions via which states transitions occur. These conditions are classified into two categories. One category includes ESS rated specifications. If BWL current of battery is detected either in excess of maximum battery rating or less than minimum battery rating (e.g., during regenerative braking), these conditions are activated and a state change occurs. This is a protective feature for the battery at the state machine controller level, but obviously independent protective functions are required in addition at the supervisory control level. The second category of conditions checks the mismatch between motor demand and generator supply. The latter is the subject of the following analysis.

Figure 5A:
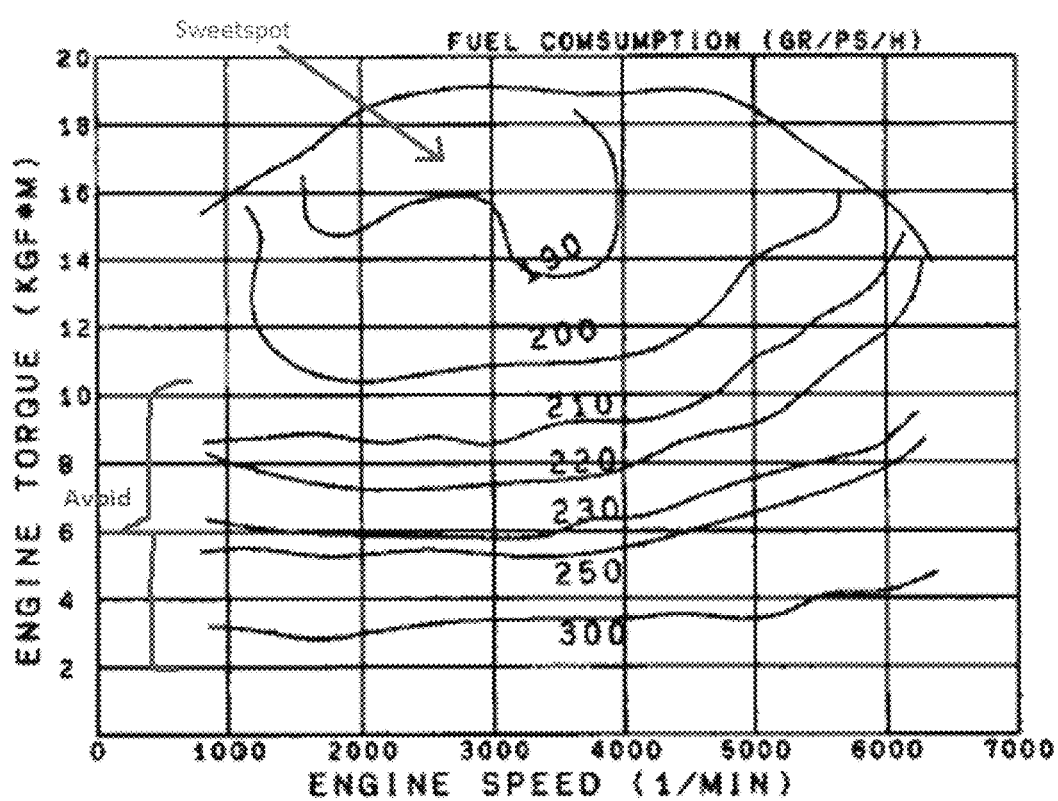
FIG. 5a depicts a typical engine map of the brake-specific fuel consumption showing the sweet spot of lowest fuel consumption.

A typical engine map of the brake-specific fuel consumption is shown in FIG. 5a. The idea is to avoid the regions of higher fuel consumption by duty cycling the engine, loaded with the generator, between the "sweet spot" or the power generating region of lowest fuel consumption, and engine idle or cutoff. This defines two allowed engine/generator power output states regardless of the actual load on the power train. This is obviously only possible if there is intermediate energy storage on the power bus. Furthermore, this energy storage must be of adequate capacity (meaning a battery is required) to make the engine duty under load adequately long to be feasible. It is known that such methods, called "pulse and glide," can even be used in a conventional power train to dramatically increase fuel economy. However, pulse and glide is not a consumer acceptable drive cycle in most cases, and to a lesser extent it is probably not desirable to perform pure two-state duty cycling in an SHEV.

Figure 5B:
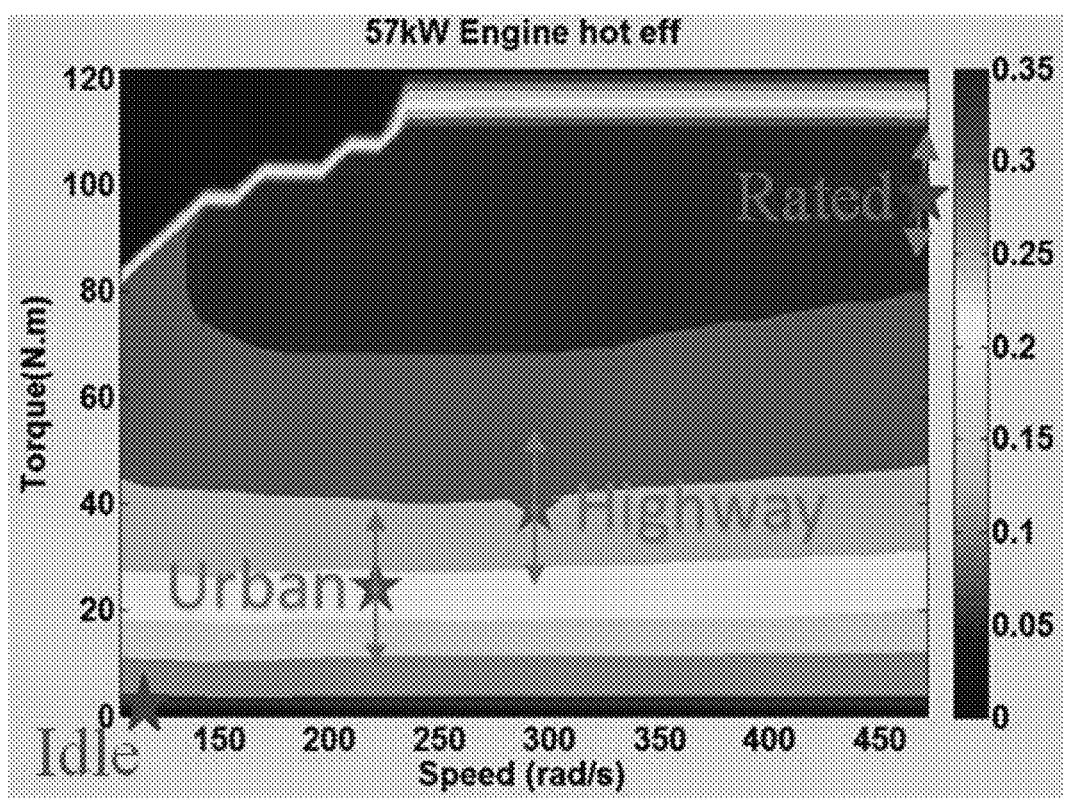
FIG. 5b depicts a graphical illustration of an engine efficiency map where multiple operating points proportional to different driving conditions are shown.

FIG. 5a shows a map of the brake-specific fuel consumption showing the "sweet spot" of lowest fuel consumption, the fuel consumption contours monotonically decreasing away from the sweet spot, and the region to "avoid" at the lower torque values which is possible by duty cycling the engine and generator between the sweet spot and engine idle or cutoff. FIG. 5b shows the engine efficiency map and multiple operating points proportional to different driving conditions.

Deriving an Estimate for the Expected Motor Current

The actual drive cycle will never match the standard published drive cycles. The actual drive cycle must be considered a random process with statistics that might be approximately represented by a standard driving behavior or with statistics that fall outside of the limits of any one particular state. Since average power balance is established in this latter condition by duty cycling between allowed states, the means must be developed to make decisions about changing states. This is done by estimating the expected motor current from the error equation. The expected value of the BWL variables is found by taking the expectation of both sides of Eq. (2):

$$E\{I'_B\} = E\{I'_M - I_G\} = E\{I'_M\} - E\{I_G\} \tag{3}$$

where the distributive property of the expectation operator in the third term in Eq. (3) is justified because it is a linear operator. If the random process (i.e., the driving cycle) is ergodic, then the expected value of the battery current and the generator current can be replaced by the time average of these variables averaged over all time.

$$\lim_{T \to \infty} \frac{1}{T} \int_0^T I'_B dt = E\{I'_M\} - \lim_{T \to \infty} \frac{1}{T} \int_0^T I_G dt \tag{4}$$

Obviously, the limiting case cannot be computed, but an estimate of the expected value for the BWL motor current can be computed if the integration is limited to a finite period. Thus $$E\{I'_M\}_{est} = \frac{1}{T} \int_0^T I'_B dt + \frac{1}{T} \int_0^T I_G dt \tag{5}$$

where T<∞.

Integrating the battery current gives the change in state of charge over the limits of integration:

$$E\{I'_M\}_{est} = -\frac{Q_C}{T}[SOC(T) - SOC(0)] + \frac{1}{T} \int_0^T I_G dt \tag{6}$$

where $Q_C$ is the capacity of the battery in Coulombs and the minus sign reflects the choice of battery current sign convention in FIG. 1. Equation (6) is rearranged to demonstrate that on average the outcome of proportional control leaves an error measured by the rate of change of the battery state of charge as shown in Eq. (7):

$$-Q_C \frac{\Delta SOC}{T} = E\{I'_M\}_{est} - \frac{1}{T} \int_0^T I_G dt \tag{7}$$

Estimation of Expected Motor Current

Two reasons persuade deriving the motor current expected value (EV). First, in actual driving conditions, the arbitrary driver never follows the standard published drive cycles. The actual drive cycle must be considered a random process the statistics of which is different to statistics of standard drive cycles. A possible scenario may occur where motor current EV is in between nominal currents of two states. In this case, duty cycling between two states is required to meet the motor current EV. For recognizing this situation, estimated motor current EV is necessary. Second, even the standard drive cycles are long time-domain signals which can be assumed to be composed of multiple sub drive cycles with different average values. This fact sometimes makes the average value of motor current over a specific short period of time totally different from overall motor current EV. Therefore, even in standard drive cycles, there is a need for estimating the current motor EV in order to make decisions for changing the state. By taking the expectation from both sides of Eq. (2), Eq. (7) can likewise again be estimated:

$$-\frac{Q_C}{T} \Delta SOC = E\{I'_M\}_{est} - \frac{1}{T} \int_0^T I_G dt \tag{7}$$

where $Q_C$ is the capacity of the battery in amp-second. In Eq. (7), the discharging current is considered positive and T is a period of time over which expected battery current and generator current is estimated by their average value.

Statistical Test for State Changes

As long as torque limits in each state produce corresponding current thresholds which bracket $E\{I'_M\}$, the controller zeroes the battery current within its bandwidth of proportional control. In this case, battery state of charge is sustained. However, if $E\{I'_M\}$ exceeds the thresholds of the proportional controller, then BWL battery current changes and the battery state of charge rate of change within the bandwidth of proportional control is accumulated. This information is useful for state changes specifically when $E\{I'_M\}$ is close to the limits.

Null hypothesis—null hypothesis is Eq. (8) because when this equation is true there is no need for changing the state, but when it is not true change should occur:

$$E\{I'_M\} = \frac{1}{T}\int_0^T I_G \, dt \quad (8)$$

Test method—a statistical test, known as student-t test, is used to evaluate the null hypothesis for state changes. Based on Eq. (7), state of charge rate of change is a variable which can be tested to show if the null hypothesis is not true. In this test, the t parameter is computed in Eq. (9) for evaluation:

$$t = \frac{\bar{x}}{s/\sqrt{N}} \quad (9)$$

$$\bar{x} = \frac{1}{N}\sum_{n=1}^{N} \frac{\Delta SOC}{n\Delta T} \quad (10)$$

$$s^2 = \frac{1}{N}\sum_{n=1}^{N}\left(\frac{\Delta SOC}{n\Delta T} - \bar{x}\right)^2 \quad (11)$$

In Eqs. (9)-(11), N is number of samples in $\Delta SOC$ string, $\bar{x}$ and s are respectively mean value and variance of state of charge rate of change over N samples, and $\Delta T$ is the sampling interval. The variable t is the variable which depends on number, mean, and variance of samples. Table 1 shows that the null hypothesis is rejected if either t is greater or less than a selected threshold. The t parameter threshold, $t_{\alpha,N}$, is selected from standard student-t look-up table. The variable $t_{\alpha,N}$ depends on number of samples and probability of correctness that is desired for making decisions (i.e., the desire to keep the rate of unnecessary state changes acceptably low).

TABLE 1

Testing Null Hypothesis for State Changes

| Reject Null Hypothesis because: | When t Test Condition is: | Resulting Action is: |
|---|---|---|
| $E\{I'_M\} > I_{G(max)}$ | $t < -t_{\alpha, N}$ | Change state to the next higher state |
| $E\{I'_M\} < I_{G(min)}$ | $t > t_{\alpha, N}$ | Change state to the next lower state |

Implementing and Tuning Controller

The present invention is comprised of at least one bandwidth-based proportional controller and at least one state machine. The bandwidth-based proportional controller and state machine are developed in Simulink and state flow library. For having an optimized performance, the controller must be tuned. Therefore, $f_0$, low pass filter bandwidth, and $t_{\alpha,N}$ are tuning variables that are manipulated to optimize the controller performance. Smaller $f_0$ leads to less engine contribution but a larger battery as well as increased overall powertrain efficiency. Smaller $t_{\alpha,N}$, for fixed number of samples N increases the risk of false decision making for engine duty cycling. These two variables can be selected through an optimization process (a genetic algorithm was used for the results shown in the controller validation) to maximize the combined city and highway fuel economy. The optimally found controller tuning parameters are $f_0 = 0.042$ Hz and $t_{\alpha,N} = 0.7669$ for the conditions imposed on the optimizing algorithm. Different conditions would likely produce different optimal outcomes for $f_o$ and $t_{\alpha,N}$.

Validating Controller Performance

Figure 6A:
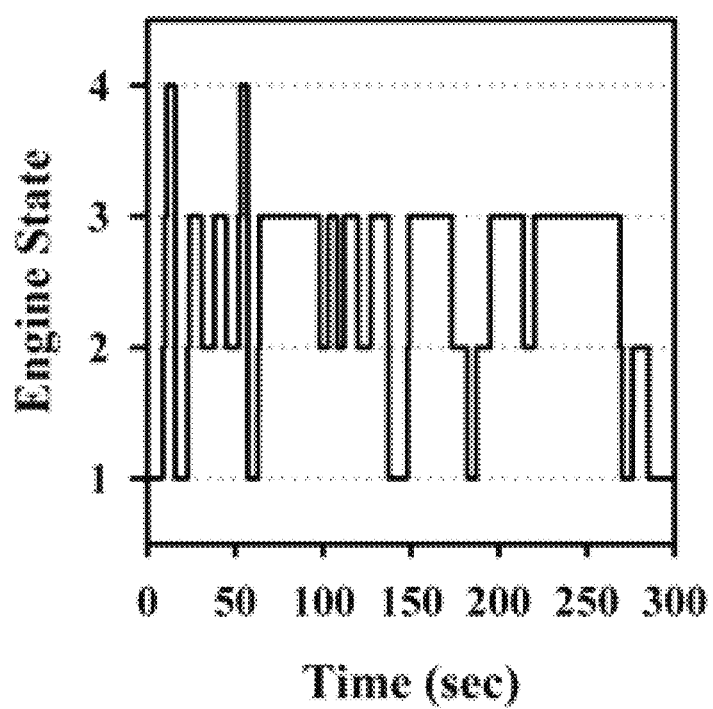
FIG. 6a depicts state machine key variables that show the performance of the controller of the invention during the first 300 seconds of driving with HWFET, specifically the state machine controller state variable.
Figure 6B:
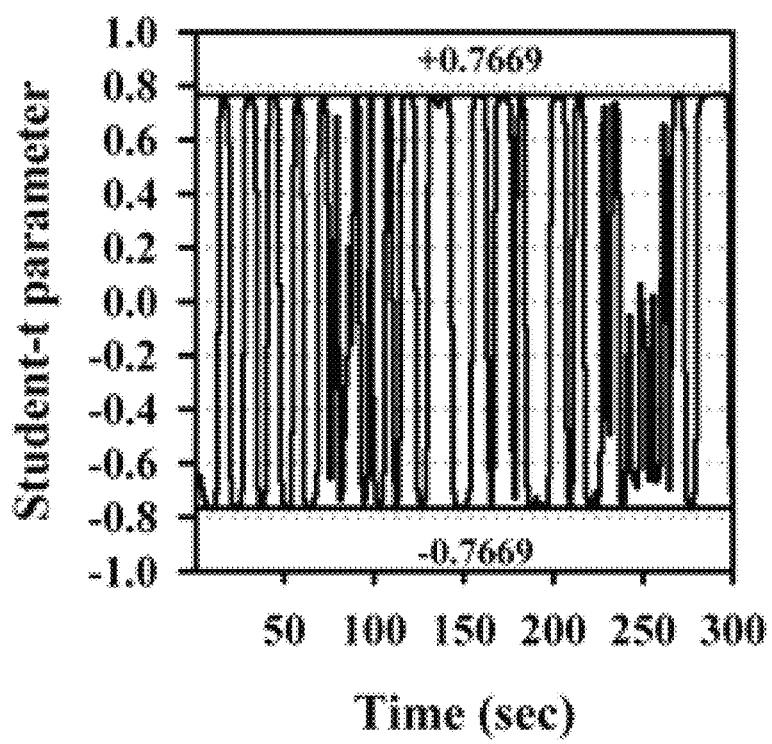
FIG. 6b depicts state machine key variables that show the performance of the controller of the invention during the first 300 seconds of driving with HWFET, specifically for the student-t parameter that is controlled between $t_{\alpha,N}=0.7669$.
Figure 6C:
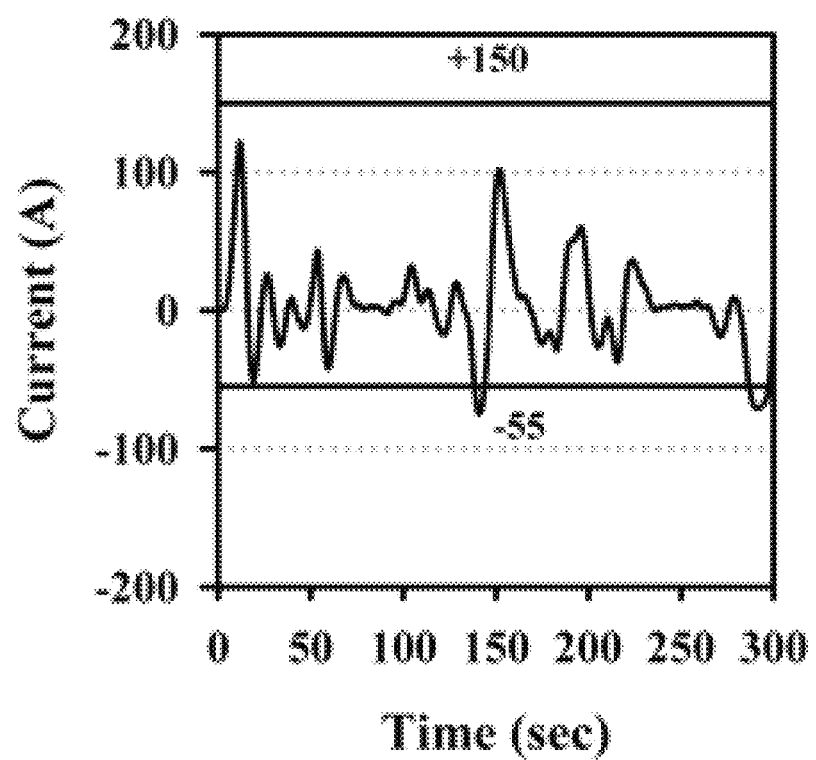
FIG. 6c depicts state machine key variables that show the performance of the controller of the invention during the first 300 seconds of driving with HWFET, specifically where the low bandwidth battery current is controlled between [−55,150] amperes.
Figure 6D:
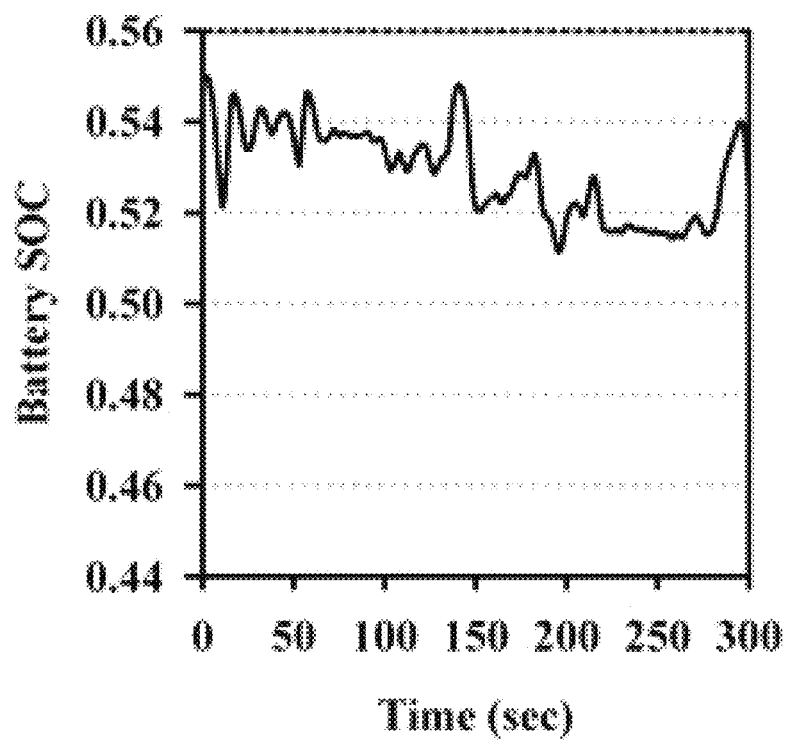
FIG. 6d depicts state machine key variables that show the performance of the controller of the invention during the first 300 seconds of driving with HWFET, specifically where the battery state of charge is sustained by the state machine controller.

Performance of the BW-based controller is assessed on extremely light ESS SHEV for city and highway driving behaviors. The reference vehicle with powertrain specifications shown in FIG. 1 is used for this analysis. Parameters of ESS and controller are shown in Table 2. Although the controller is designed to operate under actual driving conditions, as an example scenario, standard drive cycles, HWFET for highway, and UDDS for urban, excite the powertrain. FIG. 6 shows the key variables of the state machine controller that show the performance of the controller during the first 300 seconds of driving with HWFET. FIG. 6a shows the state machine controller state variable; FIG. 6b shows that the student-t parameter is controlled between $t_{\alpha,N} = \pm 0.7669$; FIG. 6c shows low bandwidth battery current is controlled between −55 and +150 amperes; FIG. 6d shows battery state of charge is sustained by the state machine controller. As noted in "State machine controller algorithm for duty cycling" and also shown in FIG. 5b, the current state is an indicator of engine operating region. In FIG. 6a, a number representing one of four states is shown on the vertical axis. As expected, just over 50% of the time, the state machine dwells in state 3 which has the average power of highway driving condition as nominal power. FIGS. 6b and 6c display two other key state machine key variables: student-t and $I'_B$, respectively. The state varies when each of these variables reach their negative or positive thresholds. In the student-t case, when a negative threshold (−0.7669) is reached, state of charge rate of change becomes statistically significant, which means the battery has been discharging because demand is higher than the available power generation in the current state. At this moment, transition to a higher state happens. These types of transitions happen three times in the first 50 seconds (see FIGS. 6a and 6b). When the positive threshold (+0.7669) is hit, the minimum generation of the current state is higher than the requested demand, and state of charge rate of change is again statistically significant, so the state machine goes to a lower state. The variable $I'_B$, minimum and maximum thresholds are set slightly below the continuous charge/discharge capability of the battery shown in Table 2 for safety margin.

TABLE 2

ESS and Controller Parameters Used in Controller Performance Validation Test

| | |
|---|---|
| I_batt_Max_10 sec pulse. (A) | 400 |
| I_batt_Min_10 sec pulse. (A) | −190 |
| I_batt_Max_Cont. (A) 150 | 150 |
| I_batt_Min_Cont. (A) | −55 |
| Engine_Ctrl_BW (Hz) | 0.05 |
| Power Interface voltage Ratio, R | 4 |
| Battery Capacity, Resistance, and Nom Voltage | A123 14 Ah 37.5 mΩ 80 VDC |
| Capacitor Capacity, | Maxwell 46.4 F |

TABLE 2-continued

ESS and Controller Parameters Used in Controller Performance Validation Test

| ESR, and Nom Voltage | 27.5 mΩ 80 VDC |
|---|---|

Figure 7A:
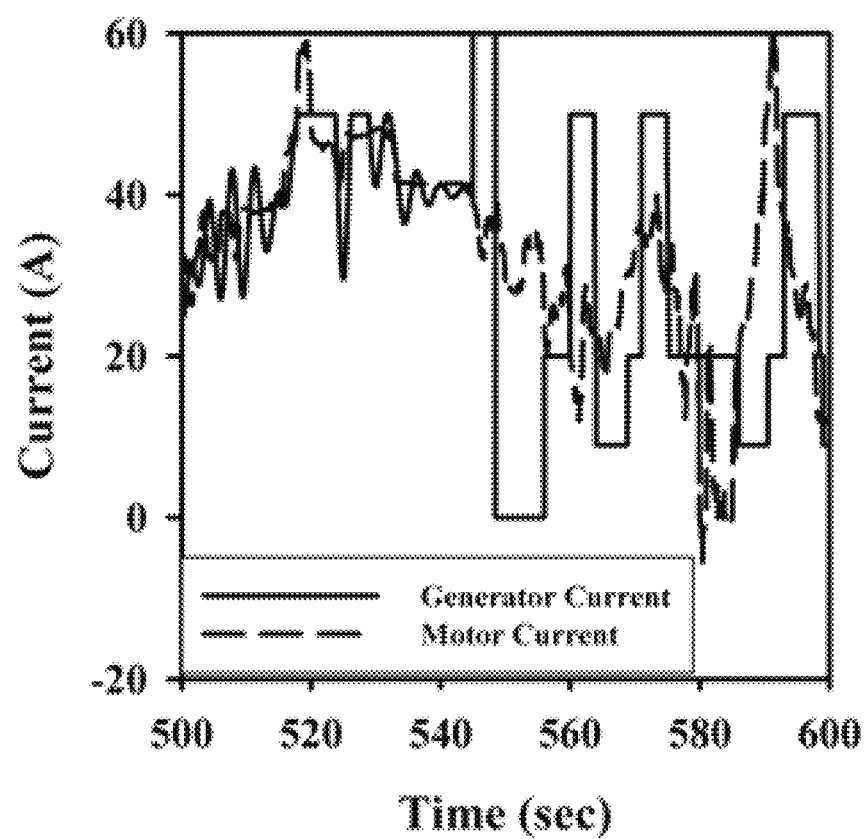
FIG. 7a depicts a graphical illustration of plots of the studies within a selected window between 500-600 seconds that led to the present invention, specifically showing the performance of a bandwidth-limited (BWL) proportional controller operating in parallel with the state machine controller to minimize the BWL battery current on ESS and showing the motor current and the bandwidth limited generator current.
Figure 7B:
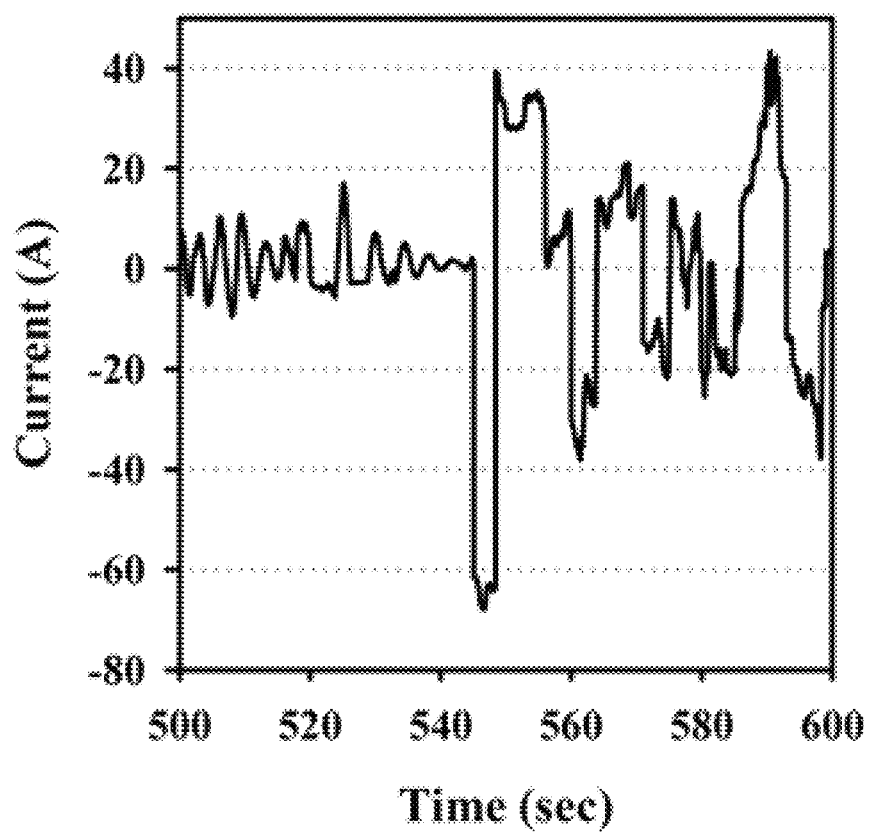
FIG. 7b depicts a graphical illustration of plots of the studies within a selected window between 500-600 seconds that led to the present invention, specifically showing the performance of a bandwidth-limited (BWL) proportional controller operating in parallel with the state machine controller to minimize the BWL battery current on ESS and showing the ESS current at the output of the converter.

Two lines in FIG. 6c specify the battery minimum and maximum current setting. A few seconds before 150 sec, $I'_B$ hits the limits and, consequently, the state machine takes the engine from state 3 to state 1 to protect the battery from over current. As a result of this power management, a combination of torque and speed is selected in a way that the engine operates in the hysteresis band shown in FIG. 5b. FIG. 6d shows the battery compensates the error while SOC is controlled. FIGS. 7a and 7b depict a selected window of this analysis between 500-600 seconds. These plots show the performance of the BWL proportional controller which operates in parallel with the state machine controller to minimize the BWL battery current on ESS. FIG. 7a shows the motor current and bandwidth limited generator current. FIG. 7b shows the ESS current at the output of the converter. In FIG. 7a, from 500 to 540 seconds, the proportional controller is able to command the generator current to track motor current very closely. As a result of this sophisticated controller performance, the bandwidth limited ESS current, which is the error signal of the control loop, is being continuously controlled about zero. Before 540 seconds, the state machine stays in state 3; however, after 540 seconds, the state machine begins duty cycling because the torque range of state 3 is not appropriate for following the motor load. A comparison between the performance of the reference vehicle of this analysis and a conventional version of the reference vehicle shows that the combined city/highway fuel economy is increased by at least about 13 percent.

Method Algorithm
Pseudo Code for State Initialization and Update

The following steps represent a testable implementation of the initialization and operation in real-time of the engine operating point controller in state 1 (UDDS), state 2 (HW-FET), and state 3 (RAP):

a. Initialization
   a.1 Set N=0 Initialize time index.
   a.2 Sample $I'_B(N)$ Observe bandwidth-limited battery current before resetting controller.
   a.3 If $I'_{B(min)} < I'_B(N) < I'_{B(max)}$ then a.4 else change state to 0 or 3 Check bandwidth-limited battery current against limits. If within limiting range then continue in the current state, otherwise change to the corresponding state (less than the minimum=state 0, more than the maximum=state 3).

$$\text{Set} \int_0^{N\Delta T} I'_B dt = 0 \qquad \text{a.4}$$

Initialize the register accumulating the integral of the bandwidth-limited battery current to zero.
   a.5 Set $\omega_{Ref} = \omega_x$ Initialize the engine speed controller to the speed for state x=1, 2, 3.
   a.6 Set $\tau_{initial} = \tau_x$ Initialize the generator torque to the starting value for state x=1, 2, 3.
   a.7 Set $\tau_{max/min} = \tau_{max/min,x}$ Initialize the max/min torque limits for state x=1, 2, 3.
   a.8 Set $\bar{x}_N = 0$ and $s_N^2 = 0$ Initialize the statistical accumulation registers to zero.

b. Update
   b.1 N=N+1 Increment time index.
   b.2 Sample $I'_B(N)$ Observe bandwidth-limited battery current.
   b.3 If $I'_{B(min)} < I'_B(N) < I'_{B(max)}$ then b.4 else change state to 0 or 3 Check bandwidth-limited battery current against limits. If within limiting range then continue in the current state, otherwise change to the corresponding state (less than the minimum=state 0, more than the maximum=state 3).

$$\int_0^{N\Delta T} I'_B dt = \Delta T \frac{I'_B(N) + I'_B(N-1)}{2} + \int_0^{(N-1)\Delta T} I'_B dt \qquad \text{b.4}$$

Update the register accumulating the integral of the bandwidth-limited battery current using the trapezoidal rule. (Note: this could be computed instead from the state-of-charge data coming from the battery management system, provided that the bandwidth of this data is neither too large nor too small.)

$$\tau_{nom} = \tau_{initial} + K_I \int_0^{N\Delta T} I'_B dt + K_P I'_B(N) \qquad \text{b.5}$$

Compute the nominal generator torque before limiting. (Note: A PI controller is assumed, but other compensating transfer functions can be used as well.)
   b.6 If $(\tau_{min} - ks_N) < \tau_{nom} < (\tau_{max} + ks_N)$ then $\tau = \tau_{nom}$ else $\tau = \tau_{max/min}$ Check nominal torque against limits scaled by the sample variance (scaling factor: $k = mV_{Bus}/\omega_{Ref}$, where m≥0). If within limiting range then set the generator torque to the nominal value, otherwise set the generator torque to the corresponding limit.

$$\bar{x}_N = \frac{N-1}{N} \bar{x}_{N-1} - \frac{1}{Q_C \Delta T N^2} \int_0^{N\Delta T} I'_B dt \qquad \text{b.7}$$

Update the statistical register accumulating the sample mean of the rate-of-change in the bandwidth-limited state-of-charge of the battery.

$$s_N^2 = \frac{1}{N} \left[ (N-1)s_{N-1}^2 + \left( \bar{x}_N + \frac{1}{Q_C N \Delta T} \int_0^{N\Delta T} I'_B dt \right)^2 \right] \qquad \text{b.8}$$

Update the statistical register accumulating the sample variance (second central moment) of the rate-of-change in the bandwidth-limited state-of-charge of the battery.

$$t = \frac{\bar{x}_N}{s_N/\sqrt{N}} \qquad \text{b.9}$$

Compute the test parameter 1.

c. Test for State Changes
  c.1 If $N<N_{Min}$ then Update else c.2 Allow changes in state, other than by exception, after minimum hysteretic delay.
  c.2 If $t<-t_{a,N-1}$ and state=1 or 2 then change to state 2 or 3 else c.3 Test for expected motor current greater than maximum generator current in state 1 or 2. True=change to the next higher state.
  c.3 If $t<-t_{a,N-1}$ and state=3 then remain in state 3 and limit motor current else c.4 Test for expected motor current greater than maximum generator current in state 3. True=limit load to rated average power by setting motor drive current (torque) limit to upper generator current (torque) limit and notifying the hybrid energy and power delivery system operator, and/or the driver in this case, or both, of the system and/or vehicle of any "red line" condition and/or other system conditions, system state(s), and/or system parameter value(s) of the hybrid power system in real time.
  c.4 If $t>t_{a,N-1}$ then change to next lower state else Update Test for expected motor current less than minimum generator current in current state. True=change to the next lower state.

Summary/Conclusions

Hybrid electric vehicles are the major contributor to the electrified vehicle market, while overall market share is nearly 4% of the entire U.S. vehicle market. An SHEV with light ESS may be a cost-effective alternative to HEV in current situations. This analysis and research is motivated by challenges associated to designs of ESS in a sport Subaru BRZ, for example, and the challenge of hybridizing a reference conventional vehicle was described. Only limited room and weight can be allocated to the ESS. Regular controls strategies are not able to manage the engine operation efficiently while keeping the extremely light ESS variables, such as currents and SOC, in permissible ranges. The bandwidth-based power flow algorithm and hybrid power system of the invention was developed which allows a reference series HEV with an 80 VDC, 1.13 kWh energy storage system was realized. The results show that a statistical test method on state of charge rate of change enables a state machine controller to manage engine duty cycling between efficient regions. Results also show that the bandwidth-based PI controller protects ESS from over current. The SHEV of the reference design of the invention and in this analysis has at least about 13% higher fuel economy compared to the conventional version.

The above detailed description is presented to enable any person skilled in the art to make and use the invention. Specific details have been revealed to provide a comprehensive understanding of the present invention, and are used for explanation of the information provided. These specific details, however, are not required to practice the invention, as is apparent to one skilled in the art. Descriptions of specific applications, analyses, and calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

The processes, system, and methods of the present invention are often best practiced by empirically determining the appropriate values of the operating parameters, or by conducting simulations to arrive at best design for a given application. Accordingly, all suitable modifications, combinations, and equivalents should be considered as falling within the spirit and scope of the invention.

REFERENCES

Argonne National Labratory, and LMS. 2013. *Autonomie*. December. Accessed Oct. 15, 2014. http://www.autonomie.net/.

Bradley, T. H., and Frank, A. 2009. "Design, demonstrations and sustainability impact assessments for plug-in hybrid electric vehicles." *Renewable and Sustainable Energy* 115-128.

Camara, M. B., Gualous, H., Gustin, F. 2010. "DC/DC Converter Design for Supercapacitor and Battery Power Management in Hybrid Vehicle Applications—Polynomial Control Strategy." *IEEE TRANSACTIONS ON INDUSTRIAL ELECTRONICS* 587-597.

Chau, K. T., and Wong, Y. S. 2002. "Overview of power management in hybrid electric vehicles." *Energy Conversion and Management* (43) 1953-1968.

He. X., Parten, M., and Maxwell, T. 2005. "Energy Management Strategies for a Hybrid Electric Vehicle." IEEE. 536-540.

Kim, Namwook, Sukwon Cha, and Huei Peng. 2011. "Optimal control of hybrid electric vehicles based on Pontryagin's minimum principle." *Control Systems Technology, IEEE Transactions* 1279-1287.

Li, Jianwei, Michael S. Mazzola, James Gafford, Bin Jia, and Ming Xin. 2012. "Bandwidth based electrical-analogue battery modeling for battery modules." *Journal of Power Sources* 331-340.

Li, S. G., Sharkh, S. M., Walsh, F. C. and Zhang, C. N. 2011. "Energy and Battery Management of a Plug-In Series Hybrid Electric Vehicle Using Fuzzy Logic." *IEEE TRANSACTIONS ON VEHICULAR TECHNOLOGY* (60) 3571-3585.

Lin, C. C., Peng, H., Grizzle, J. W., and Kang, J. M. 2003. "Power Management Strategy for a Parallel Hybrid Electric Truck." *IEEE TRANSACTIONS ON CONTROL SYSTEMS TECHNOLOGY* 839-849.

Liu, J., and Peng, H. 2008. "Modeling and Control of a Power-Split Hybrid Vehicle." *IEEE TRANSACTIONS ON CONTROL SYSTEMS TECHNOLOGY* 1242-1251.

Mapelli, F., Mauri, M., and Tarsitano, D. 2009. "Energy control strategies comparison for a city car Plug-In HEV." *Industrial Electronics, 2009. IECON '09. 35th Annual Conference of IEEE*. Porto: IEEE. 3729-3734.

Moreno, Jorge, Micah E. Ortúzar, and L. W. Dixon. 2006. "Energy-management system for a hybrid electric vehicle, using ultracapacitors and neural networks." *Industrial Electronics, IEEE Transactions* 614-623.

Poursamad, Amir, and Morteza Montazeri. 2008. "Design of genetic-fuzzy control strategy for parallel hybrid electric vehicles." *Control Engineering Practice* 861-873.

Shahverdi, M., Mazzola, M., Doude, M., Grice, Q. 2014. "A hybrid electric vehicle with minimal energy storage system." *Transportation Electrification Conference and Expo (ITEC)*, 2014 *IEEE*. Dearborn: IEEE. 1-6.

Shahverdi, Masood, Michael Mazzola, Nicolas Sockeel, and Jim Gafford. 2014. "High bandwidth energy storage devices for HEV/EV energy storage system." *Transportation Electrification Conference and Expo (ITEC)*, 2014 *IEEE*. Dearborn: IEEE. 1-5.

Tani, Abdallah, Mamadou Ballo Camara, and Brayima Dakyo. 2012. "Energy management based on frequency approach for hybrid electric vehicle applications: Fuel-cell/lithium-battery and ultracapacitors." *Vehicular Technology, IEEE Transactions* 3375-3386.

Wang, Lei, Emmanuel G. Collins Jr, and Hui Li. 2011. "Optimal design and real-time control for energy management in electric vehicles." *Vehicular Technology, IEEE Transactions* 1419-1429.

Wirasingha, S. G., and Emadi, A. 2011. "Classification and Review of Control Strategies for Plug-In Hybrid Electric Vehicles." *IEEE TRANSACTIONS ON VEHICULAR TECHNOLOGY* (60) 111-122.

Wu, J., C-H. Zhang, and N-X. Cui. 2008. "PSO algorithm-based parameter optimization for HEV powertrain and its control strategy." *International Journal of Automotive Technology* 53-59.

Wu, Xiaolan, Binggang Cao, Jianping Wen, and Yansheng Bian. 2008. "Particle swarm optimization for plug-in hybrid electric vehicle control strategy parameter." *Vehicle Power and Propulsion Conference*. IEEE. 1-5.

Yan, W. Utkin, V., and Rizzoni, G. 2005. "Power Flow Control for a Series Hybrid Electric Vehicle." *ISIE* 2005. Dubrovnik, Croatia: IEEE.

Yoo, H., Sul, S. K., Park, Y., and Jeong, J. 2008. "System Integration and Power-Flow Management for a Series Hybrid Electric Vehicle Using Supercapacitors and Batteries." *IEEE TRANSACTIONS ON INDUSTRY APPLICATIONS* 108-114.

Conference Papers:

M. Shahverdi and Michael Mazzola. An Innovative Engine/Generator Control Algorithm for Minimizing Battery in a Hybrid Electric Vehicle with Series Architecture of Power Train. No. 2015-01-1223. SAE Technical Paper, 2015.

M. Shahverdi, M. S. Mazzola, and Q. Grice, "Pareto Frontier of Energy Storage Costs-Fuel Economies for a Series HEV Using Bandwidth Based Control," Accepted in IEEE International Transportation Electrification Conference (ITEC) 2015.

Journal Articles:

M. Shahverdi, M.S. Mazzola, Q. Grice, and M. Doude, "Optimizing the Energy Storage System Cost and Fuel Economy of a Series HEV Using Bandwidth-based Control Strategy," Submitted to IEEE Transaction on Transportation Electrification.

M. Shahverdi, M. S. Mazzola, M. Doude, and Q. Grice, "Bandwidth Based Methodology for Designing Hybrid Energy Storage System of a HEV," Submitted to IEEE Transaction on Vehicular Technology.

Book Chapter:

Rechargable Batteries, 978-3-319-15457-2: chapter 15 "Li-Ion Battery Pack and Applications"

Additional References

M. Shahverdi, M. S. Mazzola, N. Sockeel, J. Gafford, "High Bandwidth Energy Storage Device for HEV/EV Energy Storage System," In Transportation Electrification Conference and Expo (ITEC), 2014 IEEE, pp. 1-5. IEEE, 2014. (Poster Presentation, June 15-18).

M. Shahverdi, M. S. Mazzola, M. Doude, Q. Grice, "A Hybrid Electric Vehicle with Minimal Energy Storage System," In Transportation Electrification Conference and Expo (ITEC), 2014 IEEE, pp. 1-6. IEEE, 2014. (Poster Presentation, June 15-18).

M. Shahverdi and Michael Mazzola. An Innovative Engine/Generator Control Algorithm for Minimizing Battery in a Hybrid Electric Vehicle with Series Architecture of Power Train. No. 2015-01-1223. SAE Technical Paper, 2015. (Oral Presentation, April 21-23).

M. Shahverdi, M. S. Mazzola, and Q. Grice, "Pareto Frontier of Energy Storage Costs-Fuel Economies for a Series HEV Using Bandwidth Based Control," Accepted in IEEE International Transportation Electrification Conference (ITEC) 2015. (Oral Presentation, June 14-17).

M. Shahverdi, Dissertation: "Bandwidth based methodology for designing a hybrid energy storage system for a series hybrid electric vehicle with limited all electric mode", May, 2015.

M. Shahverdi, M. Mazzola, Q. Grice, and M. Doude, "Bandwidth-Based Control Strategy for a Series HEV with Light Energy Storage System", IEEE Transactions on Vehicular Technology, March, 2015.

What is claimed is:

1. A system for controlling a hybrid energy and power delivery system to optimize fuel economy and manage the consumption of stored and generated energy during a power delivery cycle, the system comprising:

at least one motor/engine, at least one generator, at least one DC-DC converter, at least one low pass bandwidth filter, and at least one battery that comprise an energy storage system (ESS);

at least one bandwidth-based proportional controller for managing in real time the performance of the ESS, duty cycling, motor/engine current, generator current, and low bandwidth battery current;

means for adjusting in real time the at least one bandwidth-based proportional controller through at least one proportional control algorithm for optimization of the proportional controller for optimizing proportional controller performance and for optimization of the hybrid energy and power delivery system, wherein the size, the weight, or both, of the ESS may be reduced;

at least one state machine controller and at least one state machine controller algorithm, wherein the at least one state machine controller has at least four states and is in parallel with the at least one bandwidth-based proportional controller having its own controller parameters, for managing duty cycling and for determining hybrid energy and power delivery system state transitions when necessary and fOr changing the state selected from the group of states consisting of idle/off, urban, highway, and rated speed, when the mismatch between the expected value of motor/engine current and the expected value of generator current is statistically significant; and means for validating proportional controller performance, wherein one hybrid energy and power delivery system state is transitioned when necessary to a different hybrid energy and power delivery system state in real time to optimize the performance of the hybrid energy and power delivery system.

2. The system of claim 1, further comprising:
   means for estimating, the real-time expected value of motor/engine current of the hybrid energy and power delivery system;
   means for statistical testing for a state change wherein the bandwidth limited battery current rate of change and the battery rate of charge rate of change within the bandwidth of the proportional controller are monitored and optimally controlled when such rates of change become statistically significant; and
   means for tuning the proportional controller for optimizing controller performance wherein at least one tuning variable is manipulated.

3. The system of claim 1, wherein the at least one proportional control algorithm initializes, updates, and modifies, when necessary, at least one hybrid energy and power delivery system state in real time to optimize the performance of the at least one bandwidth-based proportional controller, the performance of the at least one state machine controller, or both, and wherein the at least one proportional control algorithm notifies the hybrid energy and power delivery system operator of at least one specific condition, value, parameter, or a combination thereof, in real time of the hybrid energy and power delivery system.

4. The system of claim 3, Wherein the hybrid energy and power delivery system delivers power to a vehicle.

5. The system of claim 4, wherein the vehicle is a series hybrid electric vehicle.

6. The system of claim 5, wherein the system optimizes fuel economy and manages the consumption of stored and generated energy during the vehicle drive cycle.

7. A method for designing a hybrid energy and power delivery system to optimize fuel economy and manage the consumption of stored and generated energy during a power delivery cycle, the method comprising:
   providing an energy storage system (ESS) comprising at least one motor/engine, at least one generator, at least one DC-DC converter, at least one low pass bandwidth filter, and at least one battery;
   managing in real time the performance of the ESS, duty cycling, motor/engine current, generator current, and low bandwidth battery current with at least one bandwidth-based proportional controller;
   adjusting in real time the at least one bandwidth-based proportional controller through at least one proportional control algorithm for optimization of the proportional controller for optimizing proportional controller performance and for optimization of the hybrid energy and power delivery system,
   wherein the size, the weight, or both, of the ESS may be reduced;
   managing duty cycling and determining hybrid energy and power delivery system state transitions when necessary and changing the state selected from the group of states consisting of idle/off, urban, highway, and rated speed, with at least one state machine controller and at least one state machine controller algorithm, wherein the at least one state machine controller has at least four states and is in parallel with the at least one bandwidth-based proportional controller having its own controller parameters, when the mismatch between the expected value of motor/engine current and the expected value of generator current is statistically significant; and
   validating proportional controller performance, wherein one hybrid energy and power delivery system state is transitioned when necessary to a different hybrid energy and power delivery system state in real time to optimize the performance of the hybrid enemy and power delivery system.

8. The method of claim 7, further comprising:
   estimating the real-time expected value of motor/engine current of the hybrid energy and power delivery system;
   statistically testing for a state change wherein the bandwidth limited battery current rate of change and the battery rate of charge rate of change within the bandwidth of the proportional controller are monitored and optimally controlled when such rates of change become statistically significant; and
   tuning the proportional controller for optimizing controller performance wherein at least one tuning, variable is manipulated.

9. The method of claim 7, wherein the at least one proportional control algorithm initializes, updates, and modifies, when necessary, at least one hybrid energy and power delivery system state in real time to optimize the performance of the at least one bandwidth-based proportional controller, the performance of the at least one state machine controller, or both, and wherein the at least one proportional control algorithm notifies the hybrid energy and power delivery system operator of at least one specific condition, value, parameter, or a combination thereof, in real time of the hybrid energy and power delivery system.

10. The method of claim 9, wherein the hybrid energy and power delivery system delivers power to a vehicle.

11. The method of claim 10, wherein the vehicle is a series hybrid electric; vehicle.

12. The method of claim 11, wherein the method optimizes fuel economy and manages the consumption of stored and generated energy during the vehicle drive cycle.

13. A method of optimizing a real-time power delivery cycle to optimize fuel economy and manage the consumption of stored and generated energy during a power delivery cycle using a hybrid energy and power delivery system, the method comprising:
   providing an energy storage system (ESS) comprising at least one motor/engine, at least one generator, at least one DC-DC converter, at least one low pass bandwidth filter, and at least one battery;
   managing in real time the performance of the ESS, duty cycling, motor/engine current, generator current, and low bandwidth battery current with at least one bandwidth-based proportional controller;
   adjusting in real time the at least one bandwidth-based proportional controller through at least one proportional control algorithm for optimization of the proportional controller for optimizing proportional controller performance and for optimization of the hybrid energy and power delivery system,
   wherein the size, the weight, or both, of the ESS may be reduced;
   managing duty cycling and determining hybrid energy and power delivery system state transitions when necessary and changing the state selected from the group of states consisting of idle/off, urban, highway, and rated speed, with at least one state machine controller and at least one state machine controller algorithm, wherein the at least one state machine controller has at least four states and is in parallel with the at least one bandwidth-based proportional controller having its own controller parameters, when the mismatch between the expected value of motor/engine current and the expected value of generator current is statistically significant; and validating proportional controller performance, wherein one hybrid energy and power delivery system state is transitioned when necessary to a different hybrid energy and power delivery system state in real time to optimize the performance of the hybrid energy and power delivery system.

14. The method of claim 13, further comprising:

estimating the real-time expected value of motor/engine current of the hybrid energy and power delivery system;

statistically testing for a state change wherein the bandwidth limited battery current rate of change and the battery rate of charge rate of change within the bandwidth of the proportional controller are monitored and optimally controlled when such rates of change become statistically significant; and tuning the proportional controller for optimizing controller performance wherein at least one tuning variable is manipulated.

15. The method of claim 13, wherein the at least one proportional control algorithm initializes, updates, and modifies, when necessary, at least one hybrid energy and power delivery system state in real time to optimize the performance of the at least one bandwidth-based proportional controller, the performance of the at least one state machine controller, or both, and wherein the at least one proportional control algorithm notifies the hybrid energy and power delivery system operator of at least one specific condition, value, parameter, or a combination thereof, in real time of the hybrid energy and power delivery system.

16. The method of claim 15, wherein the hybrid energy and power delivery system delivers power to a vehicle.

17. The method of claim 16, wherein the vehicle is a series hybrid electric vehicle.

18. The method of claim 17, wherein the method optimizes fuel economy and manages the consumption of stored and generated energy during the vehicle drive cycle.

* * * * *